May 2, 1944.	R. L. LEDBETTER	2,348,076
FLOW METER
Filed Nov. 19, 1942
Fig. 1.
Fig. 2.
Fig. 3.
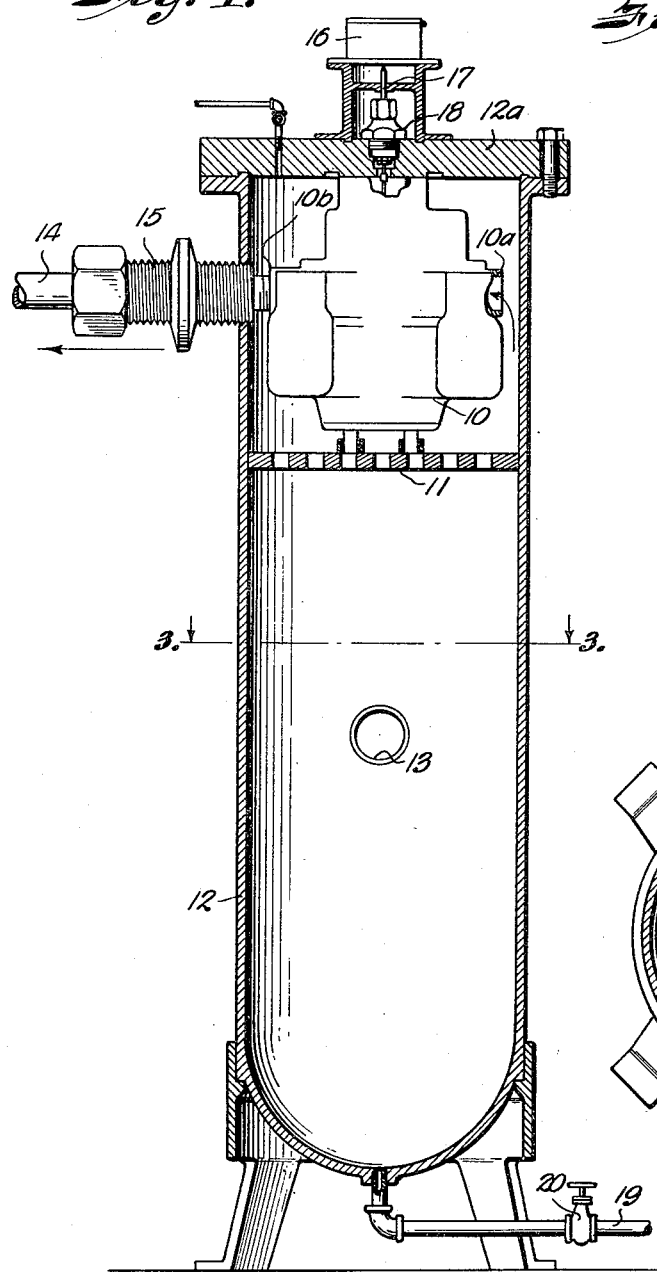
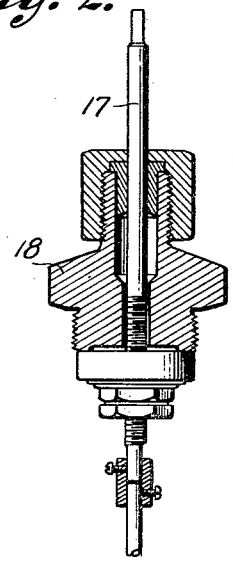
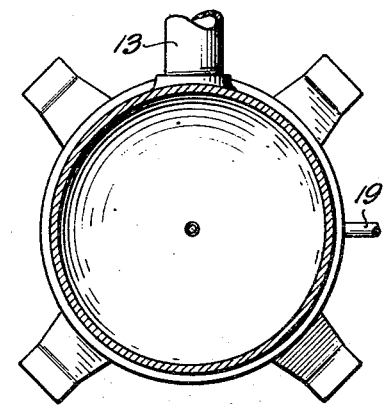
INVENTOR.
Robert L. Ledbetter
BY Thos. E. Scofield
ATTORNEY.

Patented May 2, 1944

2,348,076

UNITED STATES PATENT OFFICE 2,348,076

FLOWMETER

Robert L. Ledbetter, Basile, La., assignor to Continental Oil Company, Ponca City, Okla., a corporation of Delaware Application November 19, 1942, Serial No. 466,099

3 Claims. (Cl. 73—200)

My invention relates broadly to flow meters and more particularly to an enclosure for flow meters that increases the pressure capacity of the meter and provides a sediment chamber for fluid traversing the meter.

Flow meter casings are constructed to withstand maximum internal pressures and are ruptured by pressures in excess of the maximum. However, it is often desirable to use a meter at pressures higher than it is designed to withstand.

I am able to increase the pressure capacity of a meter by placing it in a housing capable of withstanding a higher internal pressure than the meter casing. Fluid admitted into the housing under excessive pressure surrounds the meter housing. After flowing through the casing and meter, the fluid enters the meter discharge pipe through which it passes from the housing. This construction provides the same pressures inside and outside the meter casing so that the casing can withstand any pressure that the housing can withstand. Furthermore, water and solids such as sand suspended in the fluid settle to the bottom of the housing and are easily removed. The housing can be easily and inexpensively manufactured.

From the foregoing, it will be apparent that the important object of my invention is the provision of a simple and inexpensive construction for increasing the effective pressure capacity of a flow meter.

Another object of my invention is the provision of a construction of the above mentioned character in which foreign matter suspended in the fluid can be collected and easily removed.

Other objects and advantages of my invention will be apparent during the course of the following description.

In the drawing forming a part of this specification and wherein like numerals are employed to designate like parts throughout the same, Fig. 1 is a vertical sectional view of an enclosure embodying my invention and showing a flow meter mounted therein, Fig. 2 is an enlarged vertical sectional view of a stuffing box embodying a part of the invention, and Fig. 3 is a transverse sectional view taken on the line 3—3 of Fig. 1.

In the drawing wherein, for the purpose of illustration is shown a preferred embodiment of my invention, the numeral 10 designates a conventional flow meter having a fluid inlet 10a and a fluid outlet 10b. The meter 10 is supported on a perforated baffle plate 11 in a vertically elongated housing 12. Baffle plate 11 is located to position the meter casing adjacent the top closure plate 12a of housing 12 and forms a transverse partition dividing the housing into upper and lower compartments. Fluid under pressure is admitted into the lower compartment of housing 12 through pipe 13. This fluid fills housing 12 and enters meter 10 through its inlet 10a. After traversing meter 10, the fluid enters pipe 14 through which it passes from the housing. To assure that housing 12 is at all times filled with fluid outlet pipe 14 is of smaller diameter than inlet pipe 13. A stuffing box 15 provides a fluid-tight connection between the fluid discharge pipe 14 and housing 12.

The quantity of fluid traversing the meter is registered on a measuring head 16 driven by the index shaft 17 which, in turn, is operated by mechanism in the fluid meter casing. Shaft 17 extends through a stuffing box 18 in closure plate 12a.

The portion of housing 12 below fluid pipe 13 comprises a sediment chamber in which water and solids suspended in the fluid settle. The sediment is removed through a pipe 19 controlled by valve 20. Pipe 13 is of substantially greater diameter than the meter fluid inlet 10a so that fluid is supplied to the housing faster than it is discharged through the meter. Accordingly, housing 12 is filled with fluid at all times and the pressure of the fluid within the housing will be equal to the pressure of the fluid in the meter. By equalizing the fluid pressure inside and outside of meter 10, the internal pressure cannot rupture the meter casing, even though it is greatly in excess of the pressure at which the casing was originally designed to operate. Fluids may be passed through meter 10 at any pressure below the pressure limit of housing 12 regardless of the pressure at which the meter is designed to operate.

After housing 12 is filled with fluid, a current will be generated between fluid inlet pipe 13 and meter inlet 10a but the fluid below pipe 13 forms a static, quiescent pool into which the water and solids settle. Further, the perforated plate 11 below meter 10 acts as a baffle preventing turbulence in the fluid around inlet 13 from affecting the fluid around the meter and resisting any tendency of the current to carry sand or other solids into the meter. The current will not disturb sediment in the bottom of housing 12. Oil flowing from a well often contains substantial quantities of sand. If this oil is passed directly through a meter 10, the sand particles pack within the meter rendering it ineffectual and requiring frequent cleaning. Furthermore, the sand particles carried through the meter by the fluid cause rapid wear of the meter parts. If a large portion of the sand is precipitated from the fluid before it enters the casing, it will be necessary to clean the meter less often and the wear of the meter parts is greatly reduced.

It is to be understood that the form of the invention herein shown and described is to be taken as a preferred example of the same and that various changes in the size, shape, and arrangement of parts can be resorted to without departing from the spirit of my invention or the scope of the appended claims.

Having thus described my invention, I claim:

1. In combination with a flow meter having a fluid inlet and a fluid outlet, a vertically elongated housing enclosing the meter, said housing capable of withstanding greater internal pressure than the meter and the interior of the housing communicating with the fluid inlet of the meter; a perforate baffle plate supporting the meter in the upper end of the housing, said baffle plate forming a horizontal partition dividing the housing into upper and lower compartments; an inlet adapted to admit fluid under pressure into the lower compartment of the housing, said housing inlet located substantially above the bottom of the housing whereby a relatively quiescent pool of the fluid into which sediment from the incoming fluid will settle is formed in the housing below the housing inlet and substantially below the baffle plate whereby said plate resists any tendency of the fluid to carry sediment into the meter; and a fluid outlet of lesser diameter than said fluid inlet extending from the meter outlet and exteriorly of the housing.

2. In combination with a flow meter having a fluid inlet and a fluid outlet, a vertically elongated housing enclosing the meter, said housing capable of withstanding greater internal pressure than the meter and the interior of the housing communicating with the fluid inlet of the meter; a perforate baffle plate supporting the meter in the upper end of the housing, said baffle plate forming a horizontal partition dividing the housing into upper and lower compartments; an inlet adapted to admit fluid under pressure into the lower compartment of the housing, said housing inlet located substantially above the bottom of the housing whereby a relatively quiescent pool of the fluid into which sediment from the incoming fluid will settle is formed in the housing below the housing inlet and substantially below the baffle plate whereby said plate resists any tendency of the fluid to carry sediment into the meter; and means for draining sediment from the bottom of the housing.

3. In combination with a flow meter having a fluid inlet and a fluid outlet, a vertically elongated housing enclosing the meter, said housing capable of withstanding greater internal pressure than the meter and the interior of the housing communicating with the fluid inlet of the meter; a perforate baffle plate supporting the meter in the upper end of the housing, said baffle plate forming a horizontal partition dividing the housing into upper and lower compartments; an inlet adapted to admit fluid under pressure into the lower compartment of the housing, said housing inlet located substantially above the bottom of the housing whereby a relatively quiescent pool of the fluid into which sediment from the incoming fluid will settle is formed in the housing below the housing inlet and substantially below the baffle plate whereby said plate resists any tendency of the fluid to carry sediment into the meter; and a registering device on the housing operatively connected with the meter.

ROBERT L. LEDBETTER.